United States Patent
Auer et al.

(10) Patent No.: US 6,681,652 B2
(45) Date of Patent: Jan. 27, 2004

(54) GEAR SELECTION DEVICE FOR A VARIABLE GEAR MECHANISM, ESPECIALLY FOR A BICYCLE DRIVE TRAIN

(75) Inventors: Marcus Auer, Schwebheim (DE); Martin Assel, Würzburg (DE)

(73) Assignee: SRAM Deutschland GmbH (DE)

(*) Notice: Subject to any disclaimer, the term of this patent is extended or adjusted under 35 U.S.C. 154(b) by 163 days.

(21) Appl. No.: 09/793,857

(22) Filed: Feb. 26, 2001

(65) Prior Publication Data

US 2001/0031682 A1 Oct. 18, 2001

(30) Foreign Application Priority Data

Feb. 26, 2000 (DE) .......................................... 100 09 214

(51) Int. Cl.[7] ................................................. F16C 1/12
(52) U.S. Cl. ..................................... 74/501.6; 116/28.1
(58) Field of Search ............................. 74/501.6, 502.2, 74/507, 473.13, 473.14; 116/28.1, 284, 305

(56) References Cited

U.S. PATENT DOCUMENTS

| | | | | |
|---|---|---|---|---|
| 3,234,814 A | * | 2/1966 | Buckerridge et al. | 74/507 |
| 3,524,979 A | | 8/1970 | Cohen et al. | 74/488 |
| 3,633,437 A | * | 1/1972 | Ishida | 74/501.6 |
| 3,839,724 A | * | 10/1974 | Muryoi | 396/88 |
| 4,048,949 A | * | 9/1977 | Schmidt | 116/248 |
| 5,178,033 A | * | 1/1993 | Kund | 116/28.1 |
| 5,325,735 A | * | 7/1994 | Nagano | 74/473.13 |
| 5,676,022 A | * | 10/1997 | Ose | 74/502.2 |
| 5,732,598 A | * | 3/1998 | Shoge et al. | 74/473.13 |
| 5,921,139 A | * | 7/1999 | Yamane | 74/473.13 |
| 6,282,750 B1 | * | 9/2001 | Bishop et al. | 16/277 |

FOREIGN PATENT DOCUMENTS

| | | |
|---|---|---|
| DE | 32 15 427 | 10/1983 |
| EP | 552 775 | 7/1993 |
| EP | 669 249 | 8/1995 |
| JP | 355055274 A * | 4/1980 |

* cited by examiner

Primary Examiner—Chong H. Kim
(74) Attorney, Agent, or Firm—Milan Milosevic; Lisa Wunderlich

(57) ABSTRACT

A gear selection device for a variable gear mechanism, especially for a bicycle gear drive mechanism, with a control device, which acts via a force-transmitting element on the variable gear mechanism; with an actuating device with a rotatable actuating element for manual actuation of the control device; and with a display device with an indicator element, which can move along an arc to display the engaged gear selected via the actuating device. The angular movement of the actuating device or control device is transmitted via a transmission device to the display device in such a way that the arc through which the indicator element of the display device passes is smaller than the arc through which the actuating element of the actuating device passes as the same time. This improves the readability of the display device and also improves the ergonomics of the gear selection device.

11 Claims, 3 Drawing Sheets

GEAR SELECTION DEVICE FOR A VARIABLE GEAR MECHANISM, ESPECIALLY FOR A BICYCLE DRIVE TRAIN

BACKGROUND OF THE INVENTION

The invention pertains to a gear selection device for a variable gear mechanism, especially for a bicycle drive train.

Bicycles, both for everyday use and also for sporting use, are always equipped today with transmission devices, which offer a few or many gear ratios so that the rider can select the power and pedalling rate which are optimal for a particular state of physical fitness, for a particular speed, and for a particular terrain.

For this purpose, devices are provided for changing the gear ratio of the drive mechanism, whether this be a variable gear hub or a derailleur. These gear-change devices are mounted on the bicycle in the area where the force is transmitted to the rear wheel or in the area of the pedal drive mechanism.

For reasons of ergonomics, safety, and convenience, the actuating devices which the rider uses to select the desired gear ratio are often mounted today in the area of the handlebars or on the handlebars themselves. So-called "rotary" or "thumb" shifters, for example, are used for this purpose.

To arrive at a bicycle drive train which offers optimum ergonomics, it is desirable to have the largest possible number of different gear ratios. Modern variable-gear technology makes it possible in this respect to offer 3, 5, 7, 16, 24, or more ratios. The actuating devices for changing the gears on a bicycle must be highly sophisticated ergonomically in order to give the cyclist the ability effectively to monitor, to control, and to identify the selected gear ratio from among the large number of ratios available for selection.

Requirements on a modern actuating device for a variable gear mechanism of a bicycle include not only smooth operation, for example, but also the following items, which in no way represent an exhaustive list: an ergonomic location on the bicycle, a design compatible with hand and finger movements, the use of wear-resistant and simultaneously attractive and non-slip material for the surfaces for the actuating element, and the clear display of the currently selected gear ratio, which is especially important when a large number of gear ratios are available.

The requirements on the gear display comprise in addition the ability to provide the rider with an intuitive grasp of where the selected gear falls in relation to the complete range of ratios available for selection. Thus it is necessary not only for the gear actually engaged to be displayed but also for at least the immediately adjacent gears and the available range of selectable ratios extending from the selected ratio to the upper and/or lower end of the range to be displayed as well.

In many cases, this task is accomplished today by, for example, a raised marking or a colored mark, which is provided on the manually movable actuating elements of the gear selection device. With this system, the current position of the marking shows the rider which gear is engaged by the relationship between the marking and a gear display scale, which is in a fixed position relative to the housing of the actuating device.

The disadvantage of these known display units on gear selection devices for the variable gear mechanisms of bicycles, however, especially in the increasingly common case where the mechanism offers a large number of gear ratios, is that the marking or the indicator element which tells the rider which gear has been engaged is not always located within the viewing angle of the rider which would be best for optimum and ergonomic readability. The reason for this is that, because of the large number of gears, the actuating devices must travel long distances.

The disadvantage described above, namely, the difficulty of reading at least certain parts of the gear display device, pertains especially but not exclusively to the display device of the so-called rotary grip shifter, which is standard equipment on many bicycles for everyday and sporting use. In rotary grip shifters of this type, at least a part of the hand grip of the bicycle handlebar is suitably designed so that it can be rotated essentially around the axis of the end of the handlebar. Thus, by making defined rotational movements with the hand or wrist, the rider can engage the desired gear through the intermediate action of a suitable control device and a transfer device for transferring the control movement to the variable gear mechanism.

In order to ensure that the gear selection device will operate smoothly, that the correct position can be found when moving the transmission device from one position to another, and that the ergonomic aspects are respected, the total angle of rotation of the actuating element, especially in the case of the gearshift mechanisms with a large number of different ratios, is often so large today that the marking or the indicator element can move so far in an extreme case that it is no longer within the viewing angle of the rider or at least moves to an unfavorable viewing angle at one or both ends of the gear ratio scale, this favorability or lack thereof also being a function of the seating position of the rider and his line of sight.

Display devices for the shifters of variable gear mechanisms on bicycles are known in which the currently engaged gear is represented to the rider in graphic or numerical form in a viewing window, which is stationary in relationship to the shifter. Display devices of this type avoid the disadvantage described above, that is, the difficulty of reading parts of the scale of gear ratios, but they do not meet the challenge, arising from the requirements of visual ergonomics, of presenting in visual form not only a display simply of the selected gear ratio but also a display of the relative position of the selected gear ratio within the complete range of possible ratios (compare the differences in properties between an analog display and a digital display of measurement values or time).

SUMMARY OF THE INVENTION

The object of the present invention is therefore to provide a gear selection device which meets both the requirement of clear display of the gear engaged at the time in question and the challenge of displaying the entire range of available gears, both in absolute terms and also in relationship to the engaged gear, even when there is a large number of different gear ratios and therefore a large total actuating angle of the actuating device, and by means of which it is also possible to preserve the maximum scale angle or display arc required for reasons of visual ergonomics.

According to the invention, this gear selection device has a transmission device, which transmits the angular movements of the actuating device (or control device driven by the actuating device) to the display in such a way that the arc through which the indicator element or the marking on the display device delineates or passes through in each case is smaller than the arc which the actuating element of the actuating device passes through at the same time. This means, even if, for construction reasons, the actuating device has a very large total actuating angle, the display device can still be designed in such a way that the display angle or the length of the arc of the display device on which the display scale of the complete range of gear ratios is to appear can be limited to a certain size for ergonomic reasons.

In accordance with an especially advantageous embodiment of the gear selection device, the transmission device located between the actuating device or the control device and the display device is designed as a gear, especially as a gear wheel mechanism. Because of the form-locking connection of the gear wheel mechanism, it is possible with this design to obtain the advantage of a uniform transmission ratio between the control device and the display device and also to guarantee that, in every gear which is engaged, the control device and the display will always be in the same position relative to each other, a condition which is required so that the indication of the display and the gear ratio actually selected at the time in question will always correlate uniquely with each other.

In accordance with another embodiment of the invention, the transmission device between the actuating or control element and the display device is designed as a planetary gear, and in each case has at least one sun wheel device, a planet wheel device, and a ring gear device. In this case, each of the various wheel devices should comprise at least one gear wheel or gear wheel segment.

The advantages of a planetary gear at this point include but are not limited to, for example, the relatively small space requirement, the design-related possibility of varying the transmission ratio of the transmission device over a wide range without the need for additional components, and the possibility of easily reversing the direction of movement of rotation.

When the display device of the gear selection device has a separate display or indicator element, which can be designed, for example, as a rotating pointer with a pointing range extending over a gear selection scale, an advantageous way of having the pointer of the display device execute the desired angular movement for each gear change is to have it driven by the planet wheel device of the planetary gear.

Especially advantageous in the sense of a simple, reliable, and space-saving design of the gear selection device consisting of only a few separate components is an embodiment of the invention in which the indicator element of the display device is formed identically to a planet wheel device by this planet wheel device or in which this indicator element is formed by an extension, an offset, or a spindle of the planet wheel device.

To arrive at a space-saving design with only a few components, it is also advantageous to provide a bearing for said planet wheel device for support in the axial direction. This is done by creating at least one circular or circular ring-shaped bearing surface on the end of the planet wheel device, so that this surface can rest against another bearing surface, which is in the shape of a segment of an essentially circular ring. This other bearing surface is stationary relative to the housing of the gear selection device and perpendicular to the rotational axis of the planet wheel device.

The planet wheel device can be advantageously supported in the radial direction in a similar manner by providing the planet wheel device with at least one cylindrical offset, extension, or spindle, which can roll over at least one bearing surface in the shape of a segment of a cylinder or a hollow cylinder. As a result, the location and orientation of the planet wheel device are established either radially toward the inside or radially toward the outside.

Other possible designs for the display device of the gear selection device are obtained when, in accordance with an alternative embodiment of the invention, the indicator element of the display device is driven by a ring gear device or when the indicator element is formed by a ring gear device or by a marking applied to or on the ring gear device.

Especially wide freedom of engineering and ergonomic design in the construction of the gear selection device is obtained when the gear components of the planetary gear, that is, the sun wheel device, the planet wheel device, and the ring gear device, are installed in such a way that at least two of the rotational axes of the components of the planetary gear are not parallel.

This advantageous embodiment of the invention is made possible by the fact that the sun wheel device, the planet wheel device, and/or the ring gear device are equipped with spiral teeth, helical teeth, or worm teeth. As a result of the greater freedom with respect to the arrangement and orientation of the display device and its gear display scale as well as with respect to the direction of movement of the indicator element achieved by a design of this type, it is possible to make even greater improvements in the visual and haptic ergonomics of the gear selection device according to the invention.

It is also possible, furthermore, for the transmission device between the actuating or control element and the display device to be designed in the form of a spur gear transmission, which, to achieve the desired speed reduction, has at least one step gear wheel or step gear wheel segment. The indicator element of the display device can be formed advantageously by a component in the shape of a hollow cylinder or a segment of a hollow cylinder with teeth at least on part of the end surface of the hollow cylinder or segment of the hollow cylinder, by a spur gear or a segment of a spur gear, or by a marking applied to the component in the shape of a hollow cylinder or a segment of a hollow cylinder or to the spur gear or spur gear segment.

An especially sturdy, reliable, and space-saving design of a gear selection device according to the invention is made possible in that, in accordance with yet another embodiment of the invention, the above-described component in the shape of a hollow cylinder or a segment of a hollow cylinder, which carries or constitutes the indicator element of the display device, is supported in a groove in the shape of a hollow cylinder or a segment of a hollow cylinder corresponding to the shape of the indicator element. This groove is located in, for example, the housing of the gear selection device.

An arrangement of the display device which is especially advantageous from both an ergonomic and design standpoint is obtained when, in correspondence with another embodiment of the invention, the indicator element of the display device is installed in a cylinder-shaped, hollow cylinder-shaped, or hollow cylindrical segment-shaped area, which extends like a wrapping concentrically around the handlebar of the bicycle.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
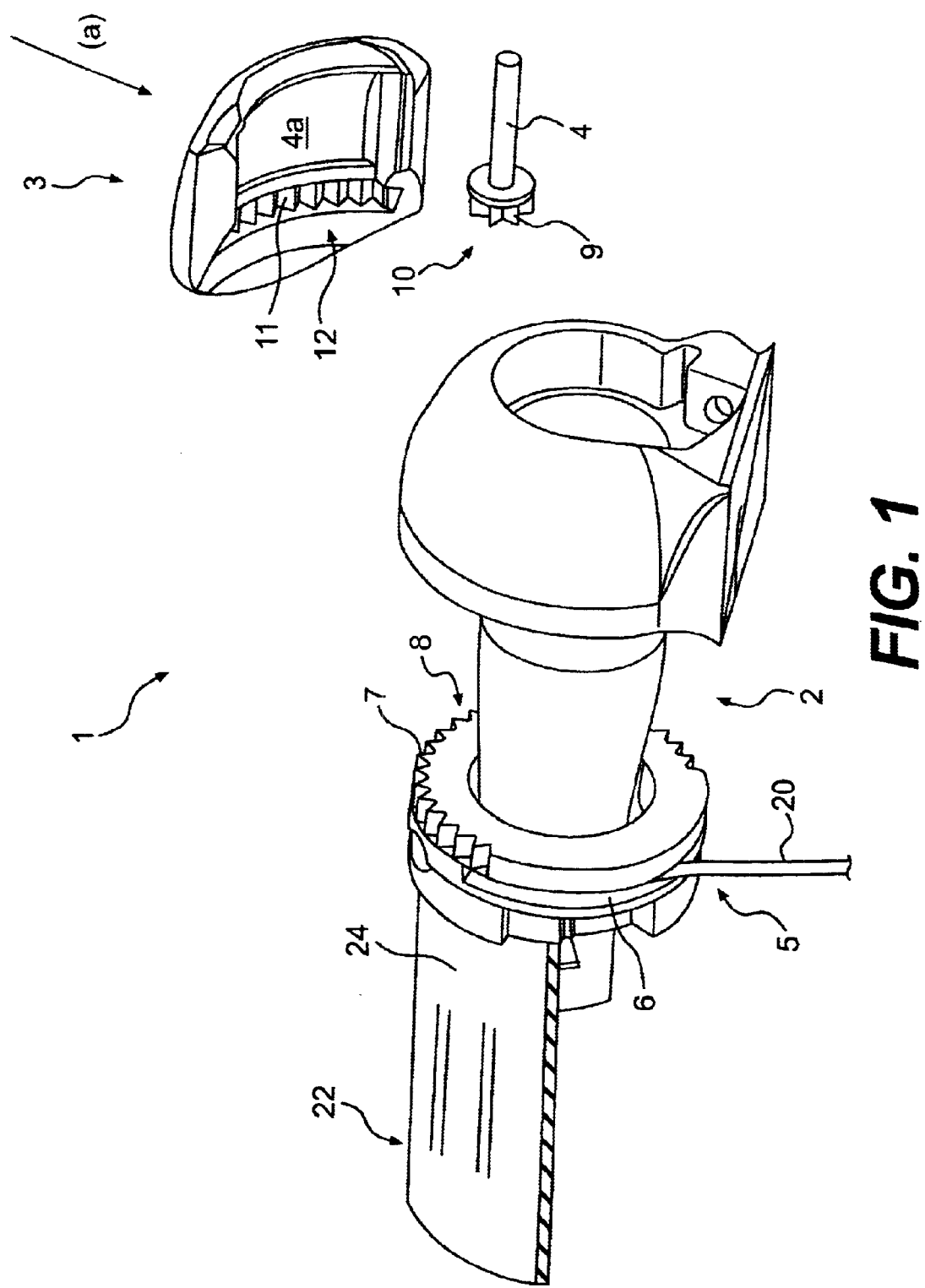
FIG. 1 shows an exploded view of a gear selection device in the form of a rotary grip shifter which can be mounted on a bicycle handlebar, the line of sight of the rider also being indicated.

FIG. 1 shows a gear selection device 1, comprising a housing 2, which can be attached to the handlebar of a bicycle; a display device 3 with an indicator element 4 and the associated display window 4a through which the indicator element 4 can be seen along the line of sight "a"; and a control device 5, with a groove 6, in which a force-transmitting element 20 such as a Bowden cable, which transmits the control movement to the variable gear mechanism, can be attached and guided. The acuating device 22 includes an actuating element 24 that may be an elastomer-coated control grip.

For reasons of clarity, the actuating device in area A with the actuating element, which can be designed as, for example, an elastomer-coated control grip, is not shown in FIG. 1.

The transmission device according to the invention for transmitting the angular movements of the actuating device via the control device 5 to the display device 3 comprises a sun wheel device 8, designed as a sun wheel segment 7, mounted on the control device 5; a planet wheel device 10, designed as a planet gear wheel 9; and a ring gear device 12, designed as a segment 11 of a ring gear wheel.

Figure 2:
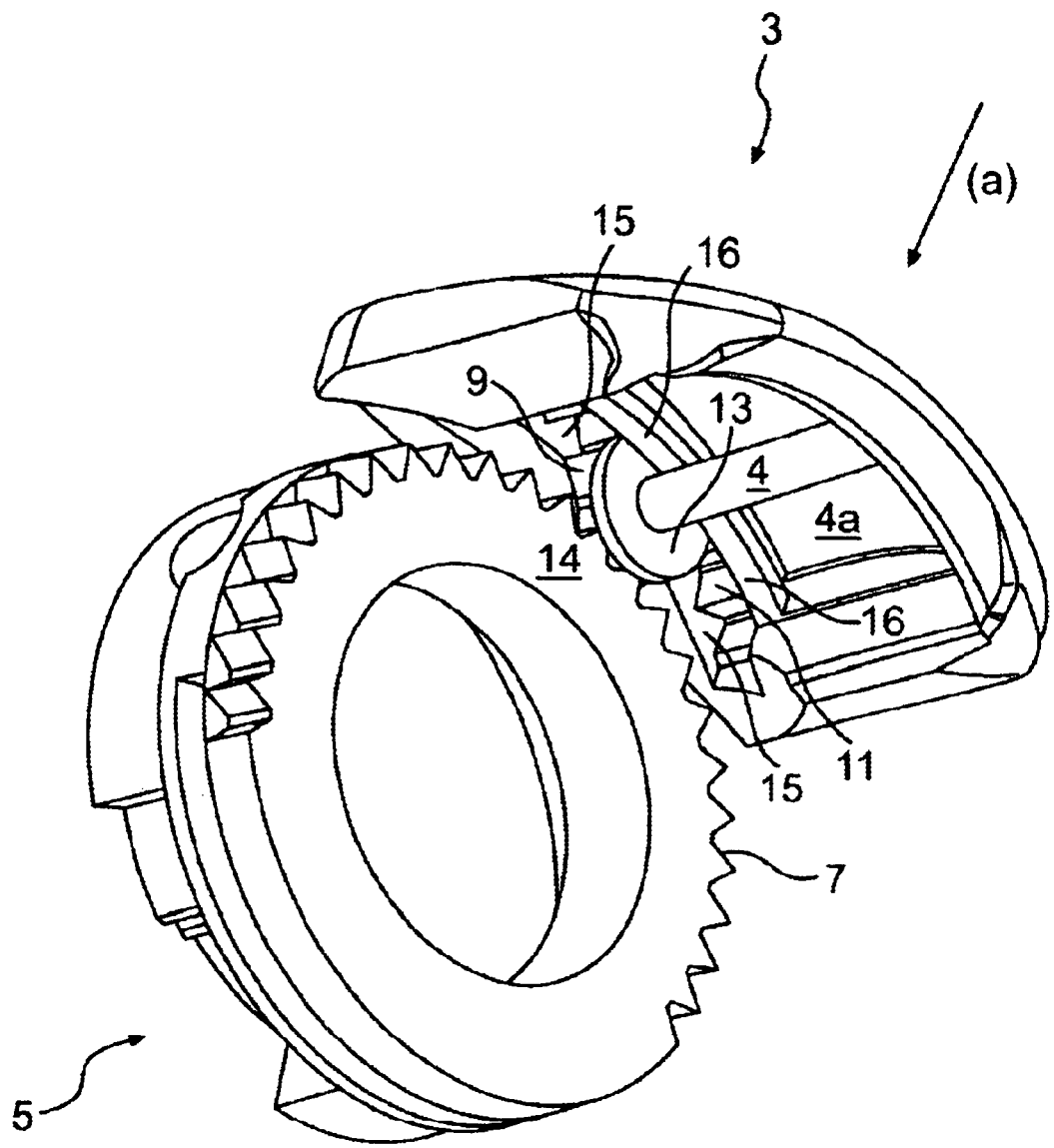
FIG. 2 shows an assembly diagram of the control device, the transmission device, and the display device of the gear selection device according to FIG. 1.

On an enlarged scale, FIG. 2 shows the assembly of the transmission device of the gear selection device 1 according to FIG. 1, comprising the sun wheel segment 7, located on the control device 5; the planet wheel 9; and the ring gear segment 11. In addition, FIG. 2 also shows the display device 3, comprising the indicator element 4 and the display window 4a, across which the indicator element 4 can be moved to display the gear ratio engaged at the time in question. The indicator element 4 moves across a gear display scale, not visible in FIG. 2, which is located on the side of the display device 3 facing the rider's line of sight. This movement of the indicator corresponds with the movement transmitted to the display device 3 by the actuating device or control device 5 via the transmission device.

In the embodiment of the invention shown here, the planet wheel 9 with its spindle 4, which forms the indicator element 4 of the display device 3, is not supported in a separate planet wheel carrier. Instead, several circular or circular ring-shaped bearing surfaces, of which in particular the circular ring-shaped bearing surface 13 can be seen in FIG. 2, are provided on the end surfaces of the planet wheel 9 to give axial support to the planet wheel 9 and its spindle 4, which forms the indicator element 4 of the display device 3. The bearing surfaces work together with several corresponding circular ring-shaped or circular ring segment-shaped bearing surfaces, of which in particular the circular ring-shaped bearing surface 14 on the sun wheel segment 7 and the circular ring segment-shaped bearing surface 15 on the housing 2 of the gear selection device 1 or on the display device 3, can be seen in FIG. 2.

In a similar manner, i.e., without the use of a separate planet wheel carrier, the planet wheel 9 with its spindle, which forms the indicator element 4, is supported in the radial direction, that is, radially from the outside in the present case, by the cooperation between several cylindrical offsets parallel to the axis of the spindle of the planet wheel 9 (or the spindle itself of the planet wheel 9, which forms the indicator element of the display device 3) and several (hollow cylinder segment-shaped) bearing surfaces, of which in particular the hollow cylinder segment-shaped bearing surface 16 can be seen in FIG. 2, which is located next to the teeth of the ring gear segment 11. The cylindrical offsets thus are able to roll across these hollow cylindrical segment-shaped bearing surfaces, while the planet wheel 9 rolls over the teeth of the ring gear segment 11.

On the radially inward side, the planet wheel 9 is supported by the teeth of the sun wheel segment 7, on which the planet wheel 9 can roll.

Figure 3:
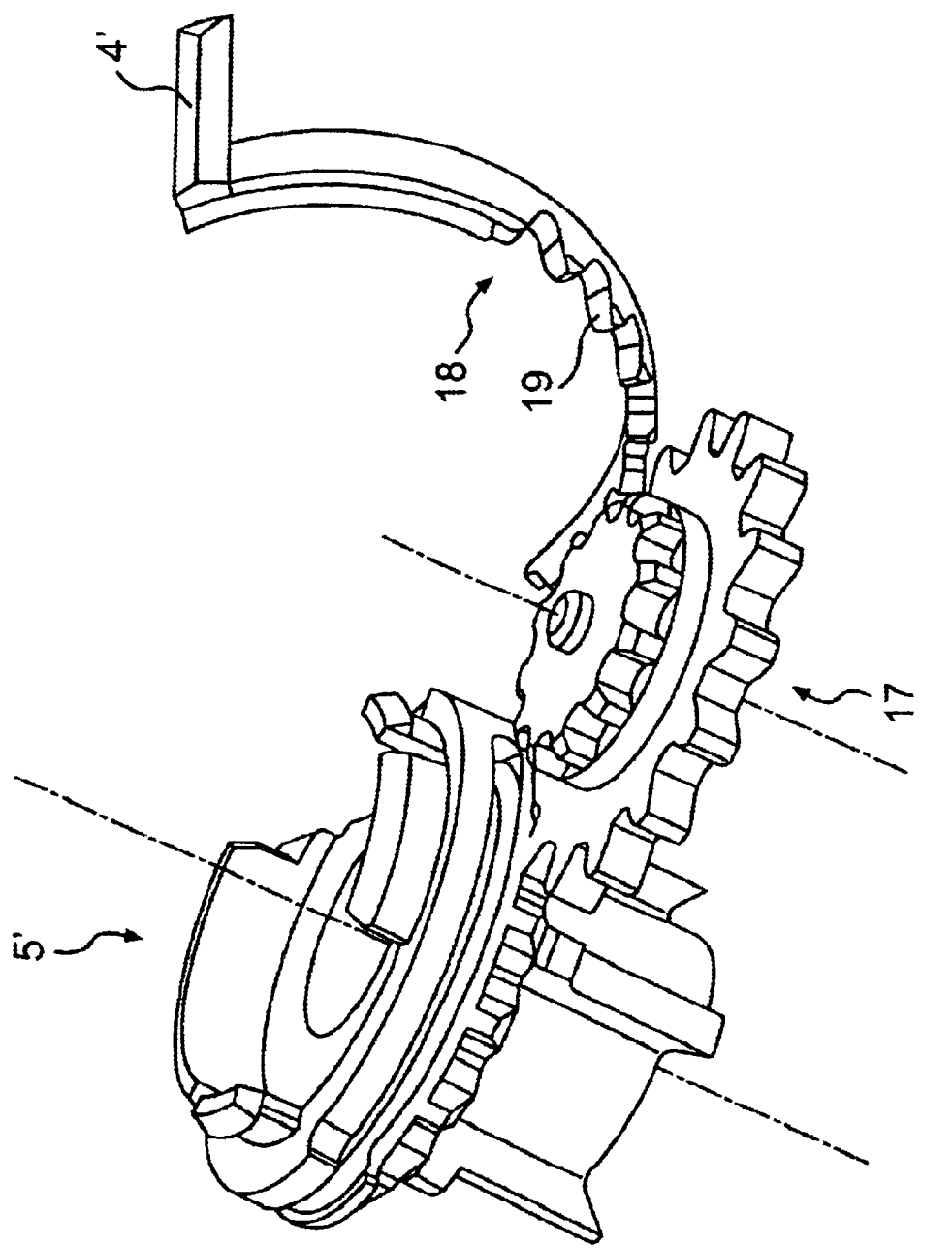
FIG. 3 shows the control device, the transmission device, and the indicator element of a display device according to an alternative embodiment of the invention, in which the transmission device is designed as a spur gear.

FIG. 3 shows a transmission device of a gear selection device 1 in an alternative embodiment of the invention, according to which the angular movements of an actuating device or control device 5' are transmitted to the indicator element 4' of the display device via a spur gear unit, which has a step wheel 17 supported in the housing of the gear selection device 1 to provide necessary reduction. This embodiment of the invention is used, for example, in a gear selection device designed in the manner of a thumb or finger shifter.

In this embodiment of the invention, the indicator element 4' forms a unit with a component 18, which is in the shape of a segment of a hollow cylinder and which is driven by the step wheel 17 via the teeth 19 on the end surface of the hollow cylindrical segment-shaped component 18. In an advantageously ergonomic, sturdy, and space-saving manner, the hollow cylinder segment-shaped component 18 can be inserted in a groove 6 in the housing of the gear selection device 1, this groove extending like a binding concentrically around the handlebar of the bicycle.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A gear selection device for a variable gear mechanism, comprising:
   a control device actuable by a force-transmitting element connected to the variable gear mechanism;
   an actuating device for manual actuation of the control device;
   a transmission device having an curved surface; and
   a display device with an indicator element arranged to move along the curved surface to display a gear selected by the actuating device, the transmission device arranged to transfer angular movements of one of the actuating device and the control device to the display device such that the indicator element moves along a portion of the curved surface to delineate a swept arc length that is always smaller than the swept arc length through which the actuating element of the actuating device passes.

2. A gear selection device according to claim 1, wherein the transmission device is a gear wheel transmission.

3. A gear selection device according to claim 2, wherein the transmission device includes a planetary gear having at least one sun wheel device, at least one planet wheel device, and at least one ring gear device, each of said wheel devices comprising one of a wheel and a gear wheel segment.

4. A gear selection device according to claim 3, wherein the display device is in driven connection with the planet wheel device of the planetary gear.

5. A gear selection device according to claim 1, wherein the indicator element of the display device is a planet wheel device.

6. A gear selection device according to claim 1, and further comprising a planet wheel device having an extension and a spindle, the indicator element being formed by one of the extension and the spindle.

7. A gear selection device according to claim 1, wherein the transmission device includes a planet wheel device having an end with at least one bearing surface which can be brought to rest against at least one bearing surface which is perpendicular to a rotational axis of the planet wheel device and which is essentially formed as a segment of a circular ring, the bearing surface on the end being configured to cooperate with the bearing surface in the form of a segment of a circular ring to form a support for the planet wheel device in an axial direction.

8. A gear selection device according to claim 1, wherein the transmission device includes a planet wheel device having least one cylindrical offset extension or spindle that is rollable along at least one bearing surface of the display device shaped as a segment of a hollow cylinder and cooperates with the segment of a hollow cylinder-shaped bearing surface to form a support for the planet wheel device in a radial direction.

9. A gear selection device according to claim 1, and further comprising a ring gear device, the indicator element being one of formed on the ring gear device, and driven by the ring gear device.

10. A gear selection device according to claim 3, wherein rotational axes of the sun wheel device, the planet wheel device, and the ring gear device are not parallel, at least one of the sun wheel device, the planet wheel device and the ring gear device having teeth that are one of spiral, screw, and worm type teeth.

11. A gear selection device according to claim 1, wherein the indicator element is a marking provided on one of a side and a top of the ring gear device.

* * * * *

(12) INTER PARTES REEXAMINATION CERTIFICATE (0142nd)
United States Patent
Auer et al.

(10) Number: US 6,681,652 C1
(45) Certificate Issued: Feb. 9, 2010

(54) GEAR SELECTION DEVICE FOR A VARIABLE GEAR MECHANISM, ESPECIALLY FOR A BICYCLE DRIVE TRAIN

(75) Inventors: Marcus Auer, Schwebheim (DE); Martin Assel, Würzburg (DE)

(73) Assignee: SRAM Deutschland GmbH, Schweinfurt (DE)

Reexamination Request:
No. 95/000,045, Jun. 4, 2004

Reexamination Certificate for:
Patent No.: 6,681,652
Issued: Jan. 27, 2004
Appl. No.: 09/793,857
Filed: Feb. 26, 2001

(30) Foreign Application Priority Data
Feb. 26, 2000 (DE) .......................................... 100 09 214

(51) Int. Cl.
*F16C 1/12* (2006.01)
*F16H 63/42* (2006.01)

(52) U.S. Cl. ..................................... 74/501.6; 116/28.1
(58) Field of Classification Search ................. 74/501.6, 74/502.2, 507, 473.13, 473.14; 116/28.1, 116/284, 305
See application file for complete search history.

(56) References Cited

U.S. PATENT DOCUMENTS

| 3,499,346 A | 3/1970 | Ishida et al. ............... 74/502.2 |
| 3,633,437 A | 1/1972 | Ishida |
| 3,901,097 A | 8/1975 | Williams et al. |
| 5,632,226 A | 5/1997 | Huang et al. ................. 116/295 |
| 6,595,894 B2 * | 7/2003 | Hanatani ..................... 475/349 |
| 2004/0139816 A1 * | 7/2004 | Takachi ....................... 74/505 |

FOREIGN PATENT DOCUMENTS

| EP | 001238899 A1 * | 9/2002 | ................ 74/502.2 |
| JP | 60-13884 | 1/1985 | |
| JP | 11-255172 | 9/1999 | |
| TW | 277491 | 6/1996 | |

OTHER PUBLICATIONS

Webster's II New Riverside University Dictionary 1994, p. 370.*
McGraw–Hill Dictionary of Scientific and Technical Terms, 1976, p. 1130.*

* cited by examiner

*Primary Examiner*—Vinh T. Luong

(57) ABSTRACT

A gear selection device for a variable gear mechanism, especially for a bicycle gear drive mechanism, with a control device, which acts via a force-transmitting element on the variable gear mechanism; with an actuating device with a rotatable actuating element for manual actuation of the control device; and with a display device with an indicator element, which can move along an arc to display the engaged gear selected via the actuating device. The angular movement of the actuating device or control device is transmitted via a transmission device to the display device in such a way that the arc through which the indicator element of the display device passes is smaller than the arc through which the actuating element of the actuating device passes as the same time. This improves the readability of the display device and also improves the ergonomics of the gear selection device.

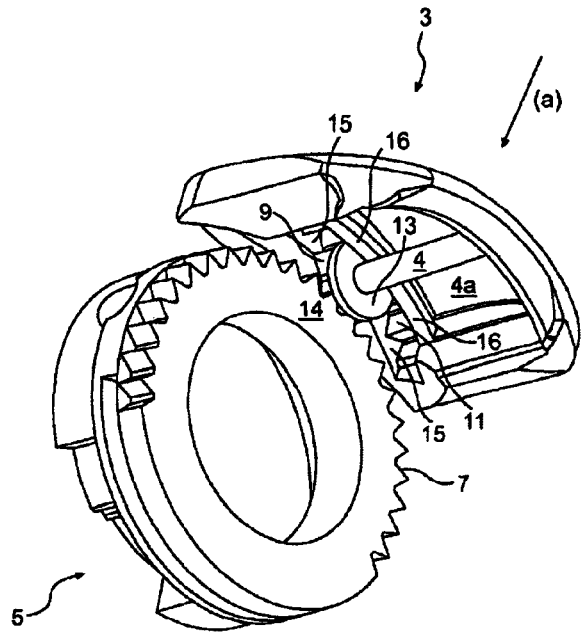

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 9 and 11 are cancelled.

Claim 1 is determined to be patentable as amended.

Claims 2–4, 6–8 and 10, dependent on an amended claim, are determined to be patentable.

1. A gear selection device for a variable gear mechanism, comprising:

a control device actuable by a force-transmitting element connected to the variable gear mechanism;

an actuating device for manual actuation of the control device;

a transmission device having an curved surface; and a display device with an indicator element arranged to move along the curved surface to display a gear selected by the actuating device, *the indicator element being a planet wheel device,* the transmission device arranged to transfer angular movements of one of the actuating device and the control device to the display device such that the indicator element moves along a portion of the curved surface to delineate a swept arc length that is always smaller than the swept arc length through which the actuating element of the actuating device passes.

* * * * *